United States Patent [19]

Akasu

[11] Patent Number: 4,527,526
[45] Date of Patent: Jul. 9, 1985

[54] IGNITION TIMING CONTROL SYSTEM FOR INTERNAL COMBUSTION ENGINE

[75] Inventor: Masahira Akasu, Hyogo, Japan

[73] Assignee: Mitsubishi Denki Kabushiki Kaisha, Tokyo, Japan

[21] Appl. No.: 641,506

[22] Filed: Aug. 16, 1984

[30] Foreign Application Priority Data

Aug. 17, 1983 [JP] Japan .................................. 58-151285
Aug. 17, 1983 [JP] Japan .................................. 58-151286
Aug. 17, 1983 [JP] Japan .................................. 58-151287

[51] Int. Cl.³ .............................................. F02P 5/04
[52] U.S. Cl. ................................... 123/425; 123/480; 123/416; 123/417; 123/478
[58] Field of Search ............... 123/425, 480, 416, 417, 123/478; 73/118, 861.3

[56] References Cited

U.S. PATENT DOCUMENTS

| 4,276,861 | 5/1980 | Kearney et al. | 123/425 |
| 4,320,729 | 5/1979 | Sawada et al. | 123/425 |
| 4,370,964 | 2/1983 | Muranaka et al. | 123/425 |
| 4,382,429 | 5/1983 | Enoshima et al. | 123/425 |
| 4,385,607 | 5/1983 | Honiden et al. | 123/425 |
| 4,388,902 | 6/1983 | Latapie | 123/425 |

Primary Examiner—Raymond A. Nelli
Attorney, Agent, or Firm—Bernard, Rothwell & Brown

[57] ABSTRACT

An ignition timing control system for an internal combustion engine comprising means for modifying the predetermined reference ignition timing of each cylinder in the positive direction when knocking has been detected or in the negative direction when knocking has not been detected, so that the engine operates at the highest efficiency.

13 Claims, 10 Drawing Figures

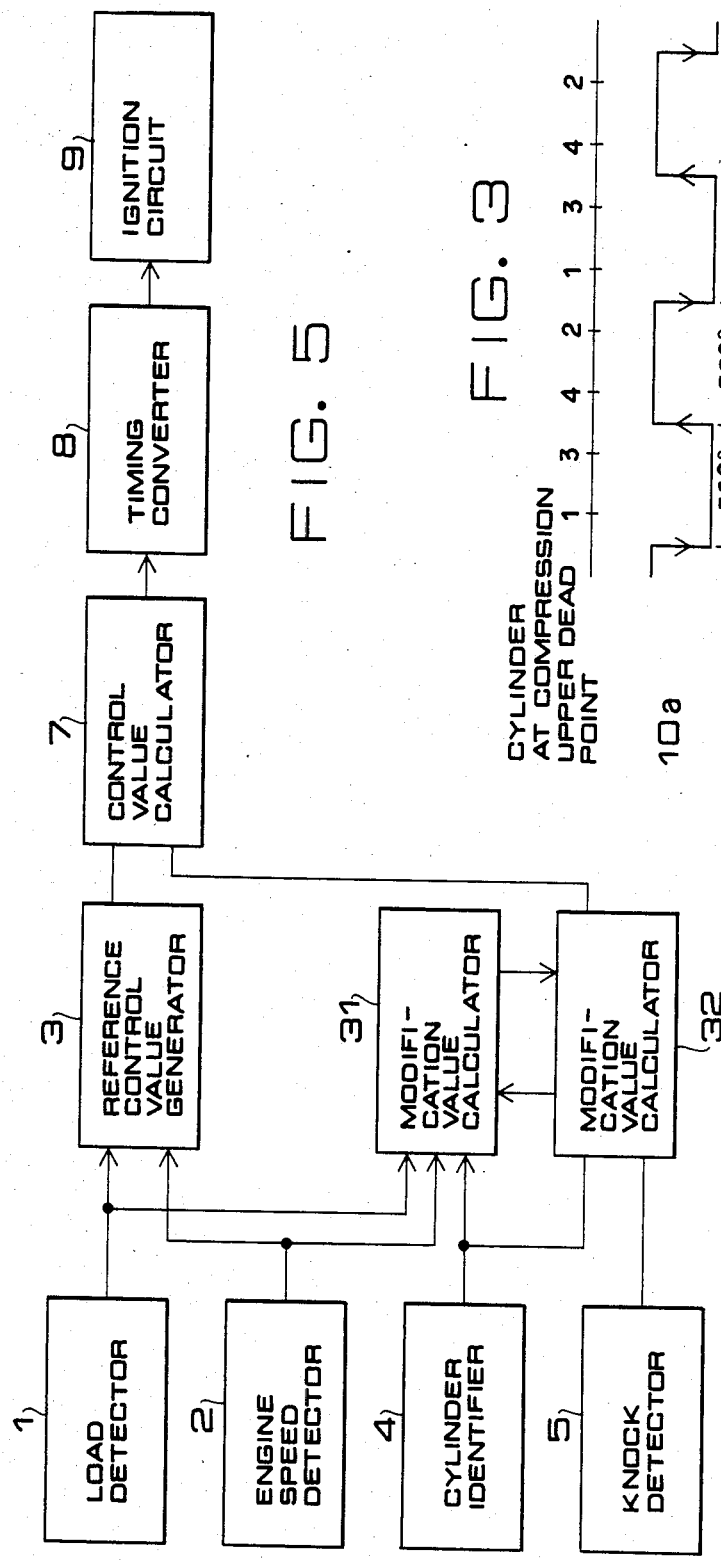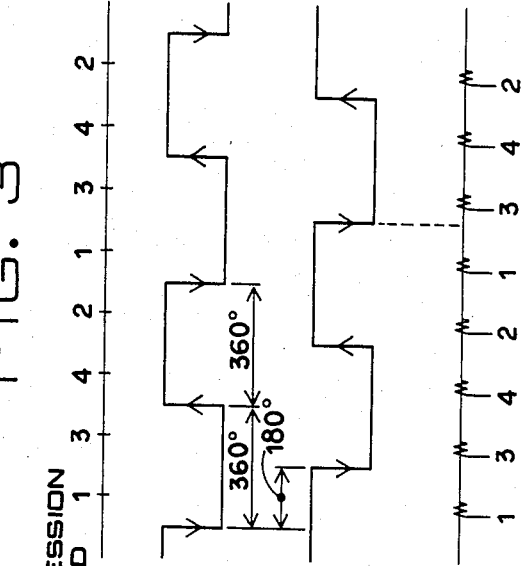

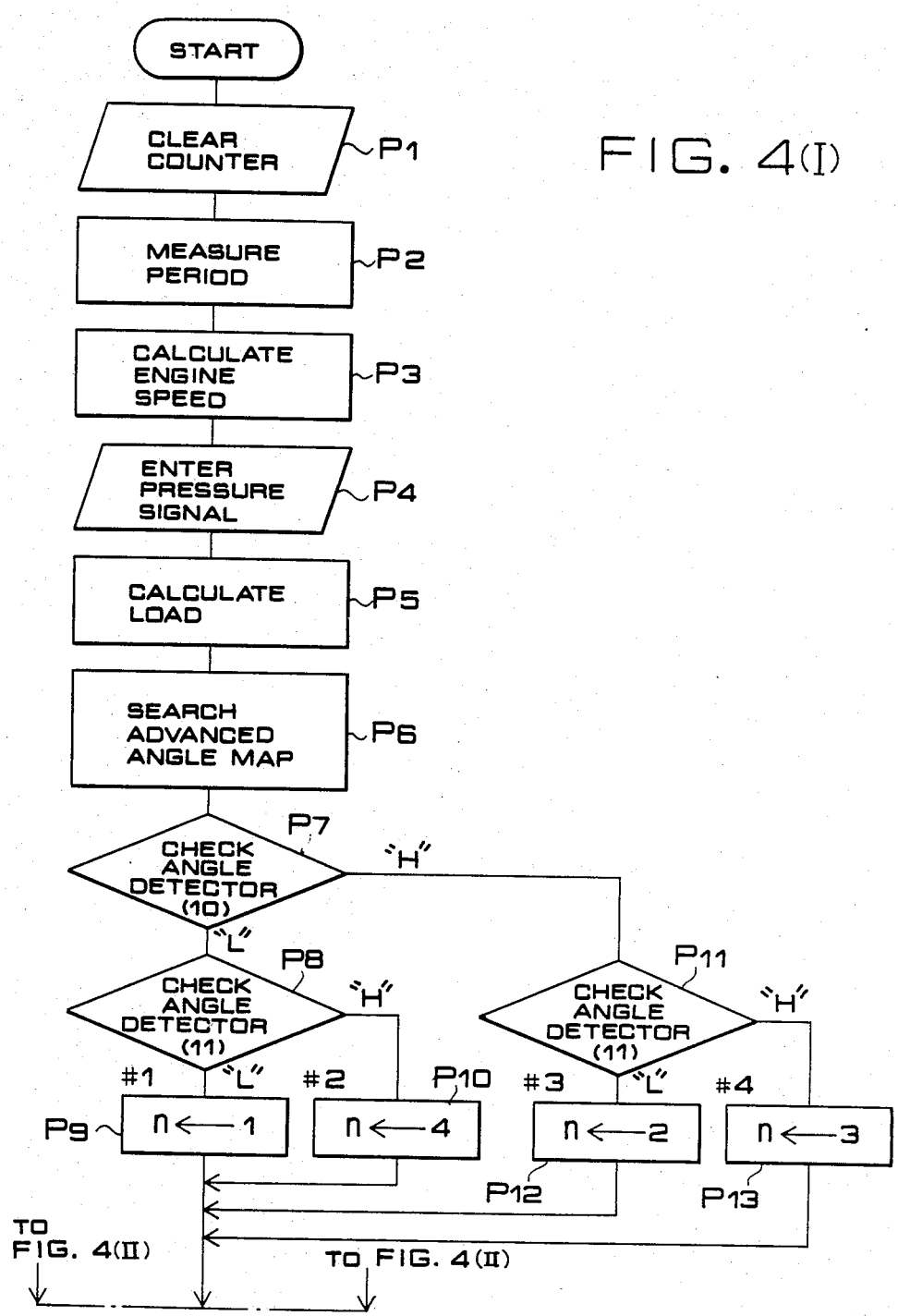

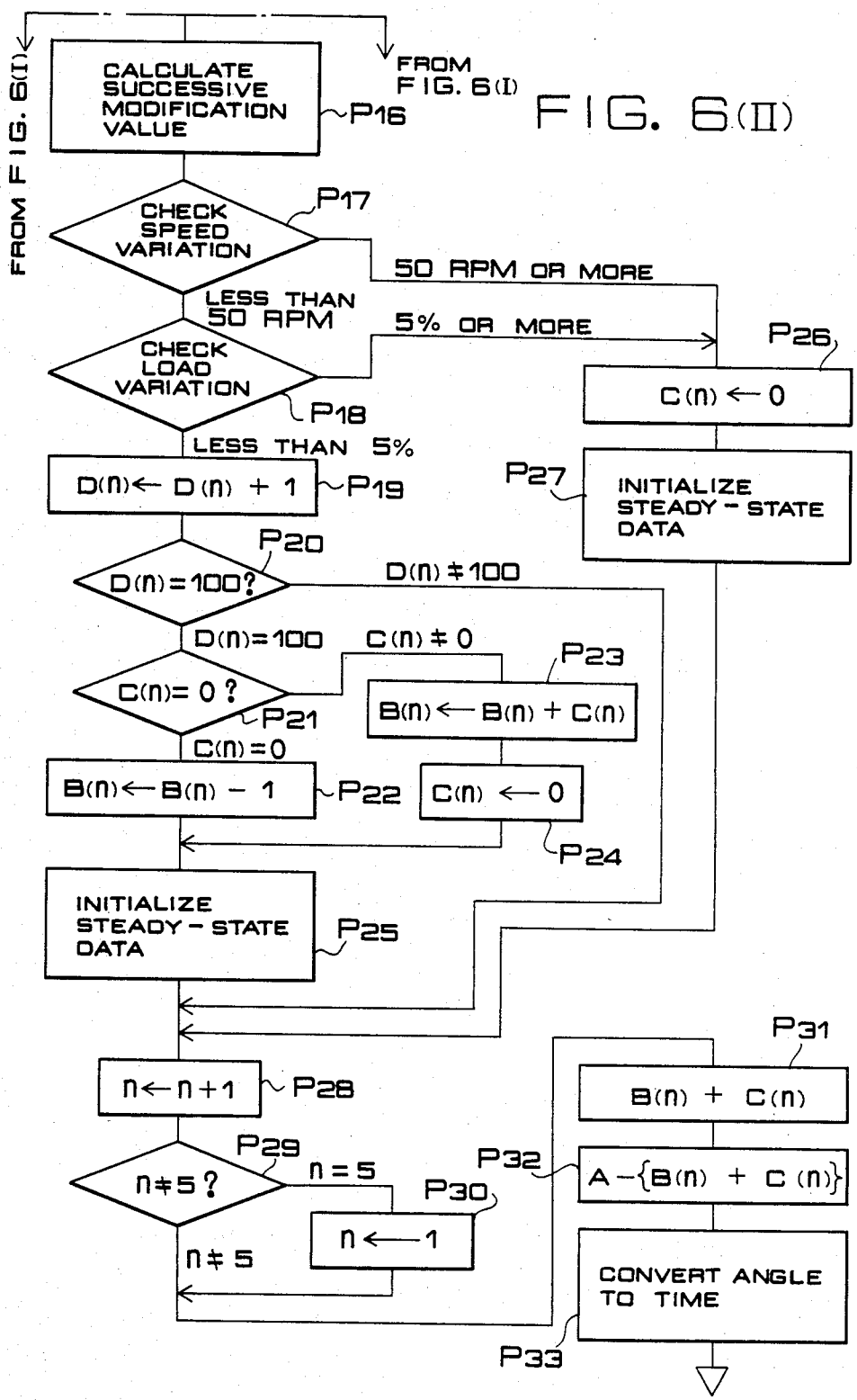
FIG. 6.(II)

IGNITION TIMING CONTROL SYSTEM FOR INTERNAL COMBUSTION ENGINE

BACKGROUND OF THE INVENTION

1. Field of the Invention

The present invention relates to a control system for controlling the timing of ignition of an internal combustion engine.

2. Description of the Prior Art

It is generally known that an internal combustion engine provides the highest efficiency concerning the output power and fuel economy when the engine is operated in a state of small knocking (critical state of knocking).

Among conventional control systems of this type there has been known a system for controlling the ignition timing to the critical state of knocking on a feedback basis by delaying the ignition signal for a certain crank angle or in proportion to the degree of strength of knocking from an ignition timing as determined based on the predetermined ignition timing characteristics at each occurrence of knocking and by decreasing the delay of ignition timing at a certain time constant after knocking has ceased. This system, however, causes all cylinders of engine to have an equally delayed ignition timing in order to suppress knocking, and if knocking occurs in one cylinder, the ignition timing is delayed not only for that cylinder, but for the remaining cylinders by the same amount of the crank angle.

Generally, each cylinder of engine has different nature on the occurrence of knocking, i.e., different ignition timing for the critical state of knocking, due to the variations of the structure, component parts and distribution of mixture. On this account such a conventional control system sets up the ignition timing to the critical knock point of a cylinder which most often tends to knock. This not always provides the best ignition timing control for the engine, and does not achieve ignition for all cylinders at their individual critical knock points.

To cope with this problem there have been proposed several ignition timing control systems in which the delay of ignition timing is controlled on a feedback basis for each cylinder individually.

Any of the foregoing feedback control systems for suppressing knocking is based on the control of delay of the ignition timing with respect to the reference ignition timing in the crank angle, and for this purpose the reference ignition timing must be set to an advanced crank angle preceding the critical knock point. On this account the ignition timing at the beginning of control is always placed within the domain of knocking, and a severe knocking occurs when the control is initiated. Therefore, it is desirable to set the reference ignition timing at a point slightly preceding the critical knock point. However, when the variation of critical knock points among cylinders is taken into consideration, such a critical setting of the reference ignition timing is practically impossible, and it is inevitable for the reference ignition timing to be set more delayed with respect to the point of critical knock point in a certain operating condition. During this operating condition with an excessive delay in the reference ignition timing, the engine operates under the ignition timing which lags behind the optimal ignition timing in the critical state of knocking, and it is not possible to control the ignition of all cylinders to the optimal ignition timing in the entire operating condition.

In addition, the conventional control systems use the reference ignition timing invariably even if the operating condition of the engine has varied, resulting in a significant time lag before the control value converges to a new reference value for the operating condition following the variation, i.e., unsatisfactory response against the variation of the operating condition. Moreover, the control systems are required to have a wide control range in order to cover the entire operational region in which knocking is to be suppressed, and it is difficult to control the ignition timing precisely in the entire operating range.

The occurrence of knocking is greatly dependent on various factors of the operational characteristics of engine, particularly the air-fuel ratio, the temperature of intake air and the humidity of intake air at the time of ignition. Among those, factors of spontaneous conditions such as the temperature and humidity of intake air vary very slowly in a period of a day or year, and therefore the occurrence of knocking also varies in a long period. In other words, during a constant operating condition, knocking will occur at a relatively constant frequency and degree of severity when observed in a short term. Namely, the control value needed to suppress knocking which occurs in a constant operating condition is substantially constant in a short term. Accordingly, the ignition timing can be controlled to the critical knock point, while suppressing the occurrence of knocking precisely and in high response by controlling the engine using the previous control value during a constant operating condition stated by specific operational parameters, and by carrying out the sequential modification control with a narrow control range in response to each knock signal for the occurrence of a small knocking during the above control. For the spontaneous factors which vary in a long period as mentioned previously, modification is possible by progressively varying the amount of above modification control value.

SUMMARY OF THE INVENTION

In one form of the present invention, the ignition timing control system for an internal combustion engine comprises means for identifying a cylinder which has been ignited previously, means for modifying the ignition timing for each cylinder, means for memorizing the reference ignition timing characteristics over the entire range of operating condition, and means for reading reference ignition timing characteristic data corresponding to the detected operating condition out of the memory means and modifying the read-out data using the modification value provided by the ignition timing modification means. The modification control value of each cylinder can be either positive or negative, so that ignition at the critical knock point is accomplished also for a cylinder with its reference ignition timing being set at a point later than the critical knock point even if the reference ignition timing characteristics are set at the central value of critical knock points of cylinders, while suppressing the occurrence of knocking at the beginning of control. Furthermore, ignition of all cylinders can be controlled to the critical knock point even in the region of operating condition where the reference ignition timing is set generally later than the critical knock point. In consequence, the optimal control of ignition timing is realized in entire range of operating condition.

In another form of the present invention, the modification control values for each cylinder are stored in the memory in correlation with the operating condition at that time. The stored modification control values are updated in a certain period in accordance with the modification value, whereby the response of knocking suppression control when the operating condition is varied can be enhanced.

BRIEF DESCRIPTION OF THE DRAWINGS

FIG. 3 is a timing chart showing the relationship between the output signals of two crank angle detectors and the sequence of ignition of cylinders applicable for the system shown in FIG. 2;

FIG. 5 is a block diagram showing another embodiment of the present invention;

DESCRIPTION OF THE PREFERRED EMBODIMENTS

Figure 1:
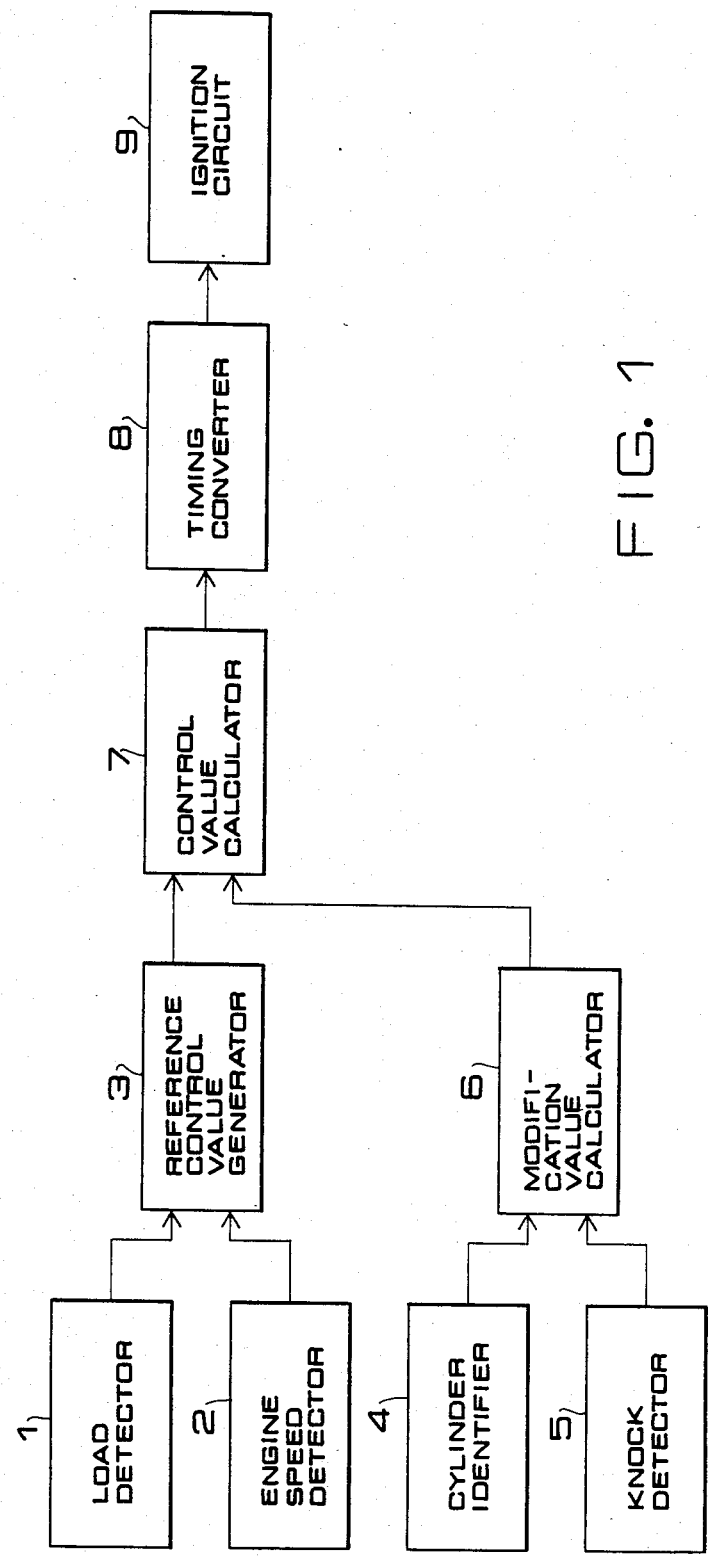
FIG. 1 is a block diagram showing the basic arrangement of the inventive ignition timing control system for an internal combustion engine.

One embodiment of the present invention will now be described with reference to the drawings. FIG. 1 is a block diagram showing the general arrangement of the present invention. A load sensor means 1 detects the load of the engine, while a speed sensor means 2 detects the rotational speed of the engine. A reference control value generation means 3 reads out a control value representing a reference ignition timing characteristic through the 2-dimensional address in accordance with the load and speed of the engine detected by the sensor means 1 and 2. A modification value computation means 6 has memory areas for modification control value for each cylinder and calculates a new modification control value based on the previous modification control value of a previously ignited cylinder identified by a cylinder identification means 4 and the knock signal provided by a knock sensor means 5 and stores the calculated value in the corresponding memory area. The modification control value can take arbitrary value of either positive or negative. A control value computation means 7 determines a cylinder to be ignited next based on information provided by the cylinder identification means 4 and modifies the reference control value read out by the reference control value generation means 3 in accordance with the modification control value for that cylinder, then generates a control value representing the ignition timing for the cylinder which will be ignited next. A timing conversion means 8 generates a timing signal in response to the control value and controls an ignition means 9.

Figure 2:
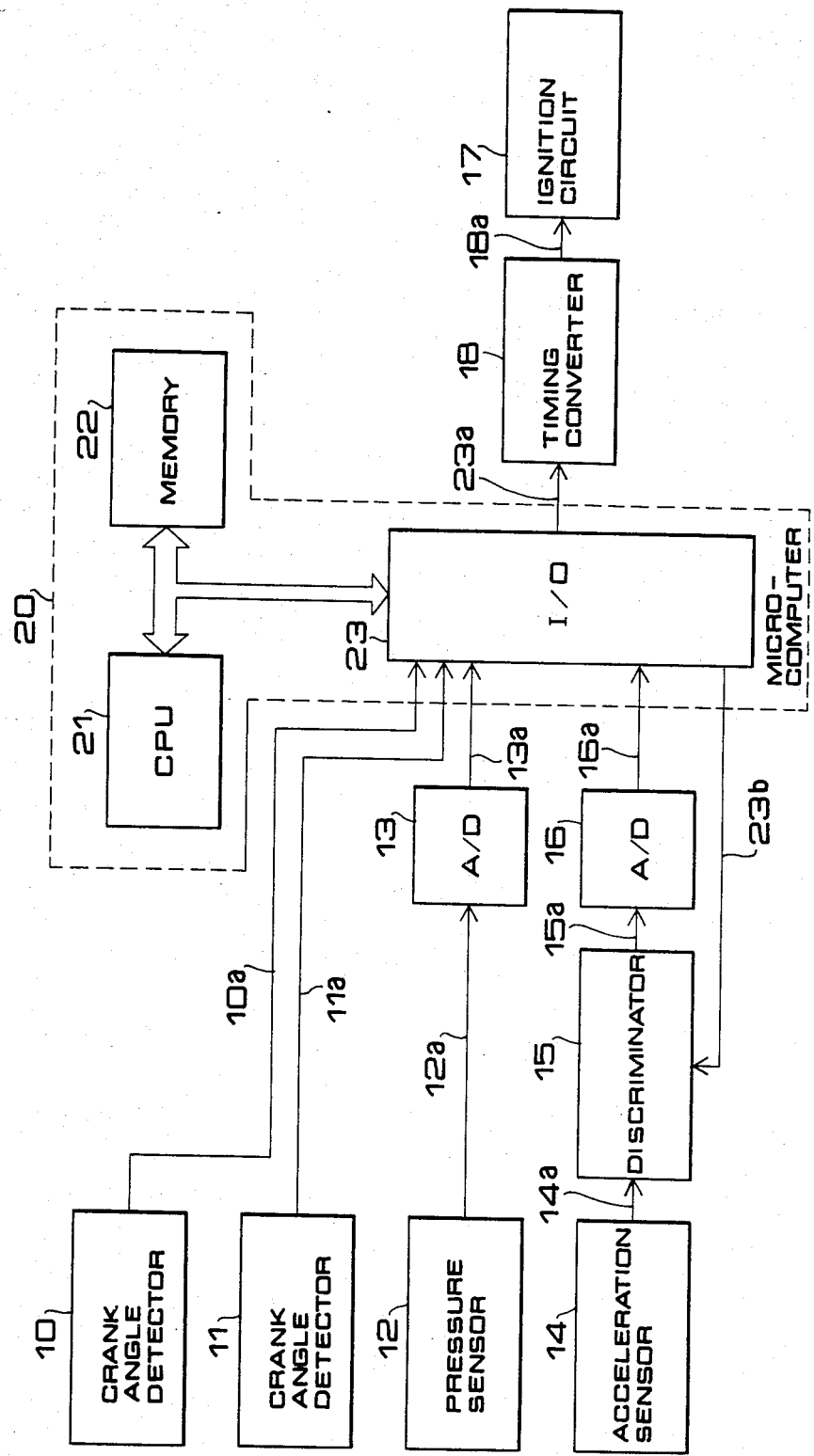
FIG. 2 is a block diagram showing one embodiment of the invention.

FIG. 2 is a block diagram showing one embodiment of the present invention, which is applied to a 4-stroke, 4-cylinder engine. In the figure, the arrangement includes a crank angle detector 10 which rotates in relation with the cam shaft of the engine and produces the signal 10a which reverses the polarity in every 360° of the crank angle, a crank angle detector 11 which produces the signal 11a with a phase difference of 180° with respect to the signal 10a produced by the detector 10, a pressure sensor 12 which detects the intake manifold pressure of the engine and produces the signal 12a representing the detected pressure, an analog-to-digital (D/A) converter 13 which converts the signal 12a provided by the pressure sensor 12 into the digital signal 13a, an acceleration sensor 14 which is fixed on the engine to detect the acceleration of vibration of the engine and produces the signal 14a, a discriminator 15 which discriminates the knock component in the signal 14a of the acceleration sensor 14 and produces the knock signal 15a, and A/D converter 16 which converts the signal 15a of the discriminator 15 into the digital signal 16a, a microcomputer 20 which consists of a microprocessor (CPU) 21, memories (ROM and RAM) 22 and an interface circuit (I/O) 23, a timing conversion circuit 18 which converts the signal 23a representing the ignition timing control value calculated by the microcomputer 20 into the timing signal 18a, and an ignition circuit 17 which performs ignition for the engine in response to the timing signal 18a provided by the timing conversion circuit 18.

Next, the operation of the foregoing arrangement of the embodiment will be described. FIG. 3 shows the waveform of the output signals of the crank angle detectors 10 and 11. As shown in the figure, as the engine rotates, the signal 10a from the detector 10 becomes "low" at BTDC 90° of the first cylinder and becomes "high" at BTDC 90° of the fourth cylinder. The signal 11a from the crank angle detector 11 has a phase lag of 180° in crank angle with respect to the signal 10a produced by the first crank angle detector 10. These two signals 10a and 11a are received by the interface circuit 23 of the microcomputer 20. The pressure sensor 12 detects the intake manifold pressure of the engine and produces the voltage signal 12a representing the detected pressure. Since the intake manifold pressure of the engine varies sensitively in response to the variation of the load of the engine, the load of the engine can be known from the magnitude of the signal 12a. The signal 12a provided by the pressure sensor 12 is transformed into the digital signal 13a by the A/D converter 13 and it is received by the interface circuit 23.

The acceleration sensor 14 is fixed to the engine, and it detects the vibration of the engine continuously. The detected signal 14a includes a noise component caused by the mechanical vibration due to the operation of the engine and a knock component caused by the vibration due to knocking. The discriminator 15 detects the knock component in the signal 14a and integrates the detected component to produce a signal 15a with its magnitude proportional to the degree of strength of knocking. The signal 15a is transformed into the digital knock signal 16a by the A/D converter 16, and it is received by the CPU 21 through the interface circuit 23. The discriminator 15 has its integral value reset by the signal 23b from the interface circuit 23 under control of the microprocessor 21, so that it is initialized for the subsequent detection of knocking.

The memory 22 of the microcomputer 20 consists of ROM and RAM. The ROM has an area (will be termed "advanced angle map") for storing reference control value representing the reference ignition timing characteristics which have been determined in terms of the engine speed and load, while the RAM has an area for each cylinder for storing modification control value for knock suppression and the count value for updating the modification control value.

The microcomputer 20 calculates the optimal ignition timing for each cylinder based on information provided by the crank angle detectors 10 and 11, pressure sensor 12 and acceleration sensor 14, and delivers the result in the form of the signal 23a to the timing converter 18. The timing converter 18 produces the timing signal 18a in accordance with its input signal and operates on the ignition circuit 17 to perform ignition of the engine.

Figure 4:
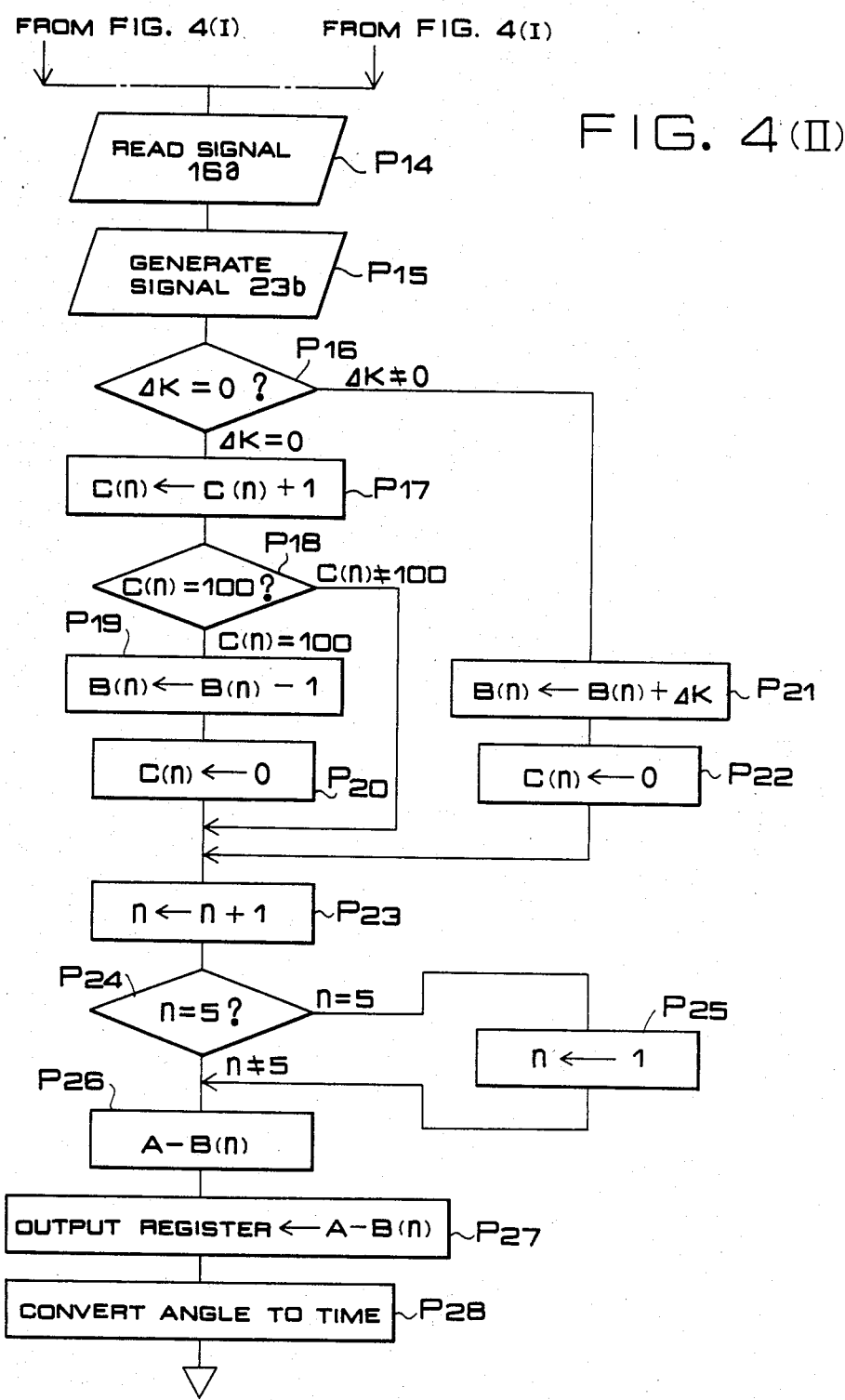
FIGS. 4(I) and (II) are a flowchart showing the operation of the system shown in FIG. 2.

FIG. 4 shows the flowchart of process carried out by the CPU 21. Blocks P1–P28 in the flowchart represent the execution steps of the process. The following describes the process of the flowchart of FIG. 4 on assumption that the engine is ignited in the order of the first, third, fourth and second cylinders.

The CPU 21 performs computation once in an ignition period when the output signal of the crank angle detector 10 or 11 makes transition in the polarity.

In step P1, the counter in the timing conversion circuit 18 is cleared and started counting. In step P2, the time interval from the previous process start point to the present, i.e., the period of 180° rotation of the crank angle, is measured. In step P3, the engine speed is calculated from the measured time period. The CPU 21 receives the pressure signal in step P4, then calculates the load of engine based on this signal in step P5. In step P6, the advanced angle map is addressed in accordance with the engine speed and load which have been calculated in steps P3 and P5, and a corresponding data of reference control value is read out and stored in register A provided in the memory 22. Step P7 checks the state of the signal 10a provided by the crank angle detector 10. If the signal 10a is "low", the cylinder which has just been ignited is the first or second cylinder as shown in FIG. 3. The subsequent step P8 checks the state of the signal 11a of the crank angle detector 11, and if it is "low", the cylinder is identified as the first cylinder. Then, in step P9, numeral "1" indicating the order of ignition for the first cylinder is stored in register n which is provided within the memory 22 for memorizing identification of the ignited cylinder. If the output state is found "high" in step P8, numeral "4" indicating the order of ignition for the second cylinder is stored in register n in step P10. On the other hand, if the output of the crank angle detector 10 is found "high" in step P7, the cylinder which has been ignited is the third or fourth cylinder, and in step P11 as in step P8 the state of the signal 11a of the crank angle detector 11 is checked. Then, if it is "low", numeral "2" indicating the order of ignition for the third cylinder is stored in register n in step P12, or if it is "high", numeral "3" indicating the order of ignition for the fourth cylinder is stored in register n in step P13. In step P14, the knock signal 16a (ΔK) is read, and in step P15, the signal 23b for clearing the integral value of the discriminator 15 is generated for preparing the subsequent detection of knocking.

In step P16, the state of the knock signal 16a (ΔK) which has been read in step P14 is checked. In the case of ΔK=0, in step P17, the contents of the count memory C (n) corresponding to the cylinder which has just been ignited as identified in the preceding steps P7–P9, out of count memories provided for each cylinder for updating modification control value, are added by one and stored again in the memory C (n). Subsequently, in step P18, it is checked whether or not the contents of memory C (n) have reached 100, i.e., whether or not the knock signal 16a (ΔK) has been "0" during a period of 100 consecutive ignitions for that cylinder, and if C (n)=100, the contents of memory B (n) storing the modification control value for that cylinder are subtracted by one in step P19. In step P20, the memory C (n) used for the count operation is cleared for the preparation of the subsequent count operation of 100 ignitions. On the other hand, if it is found in step P18 that C (n)≠0, i.e., 100 consecutive ignitions are not reached, the memory B (n) for storing the modification control value is kept unchanged, and control proceeds to step P23.

In the above step P16, if the knock signal 16a (ΔK) is encountered (ΔK≠0), ΔK is added to the contents of the memory B (n) so that the modification value increases in proportion to the degree of strength of knocking. In the subsequent step P22, the memory C (n) for measuring the 100 ignition periods for the above cylinder is cleared for the preparation of the next measurement.

Accordingly, the contents of the memory B (n) for storing the modification control value which vary depending on the state of knocking are updated to increase the value in proportion to the degree of strength of knocking when the signal 16a which is checked at each ignition of that cylinder is encountered, while on the other hand if the signal 16a is not encountered, the memory contents are updated to decrease the value by one at each interval of 100 ignitions of that cylinder. The variation range of the memory B (n) is set so that it can have either positive or negative value. The counting of 100 ignitions for determining the gain in the decreasing direction is merely an embodiment, and the present invention is of course not limited to this.

After the modification control value for the knocking cylinder has been updated by the knock signal 16a of the previous ignition, the contents of register n for storing the order of ignition are added by one in step P23 in order to determine the cylinder to be ignited next. For example, if the first cylinder has just been ignited, the register n contains "1", which is added by one to become "2", and the cylinder corresponding to this number of ignition order is the third cylinder. In step P24, the register n is checked if its contents reach "5", and if n=5, the cylinder which has been ignited previously is found to be the second cylinder, and the register n is set to "1" in step P25 so that the first cylinder will be ignited next in accordance with the order of ignition.

After the next cylinder to be ignited has been determined through the foregoing process, the stored value (reference control value) which has been read out in step P6 is modified by the modification control value for the determined cylinder. In step P26, in order to determine the final control value (advanced angle control value), the contents of register A is subtracted by the contents of memory B (n) which stores the modification control value of the next ignited cylinder, and the result is stored in the output register in step P27. This calculation result indicates the crank angle of ignition point to be controlled at present, and in step P28 this data is converted into data of time lag from the transition of the output signal provided by the crank angle detector 10 or 11. This angle-to-time converting calculation can readily be carried out based on information of period obtained in step P2 as mentioned above. The advanced angle control value converted into time domain in step P28 is held in the latch of the timing converter 18. The counter in the timing converter 18 is started when the CPU 21 starts calculation, i.e., at the transition of the output of the crank angle detector 10 or 11, and when the count becomes equal to the latched value which been set in step P28, the timing converter 18 generates an ignition signal to cut off the current in the ignition coil in the ignition circuit 17 so as to perform ignition of the engine.

Although in the foregoing embodiment cylinder identification is carried out using information provided by two crank angle detectors, the present invention is not limited to this, but for example a detector for identifying the reference cylinder may be provided so as to perform cylinder identification by counting the ignition sequentially.

Figure 6I:
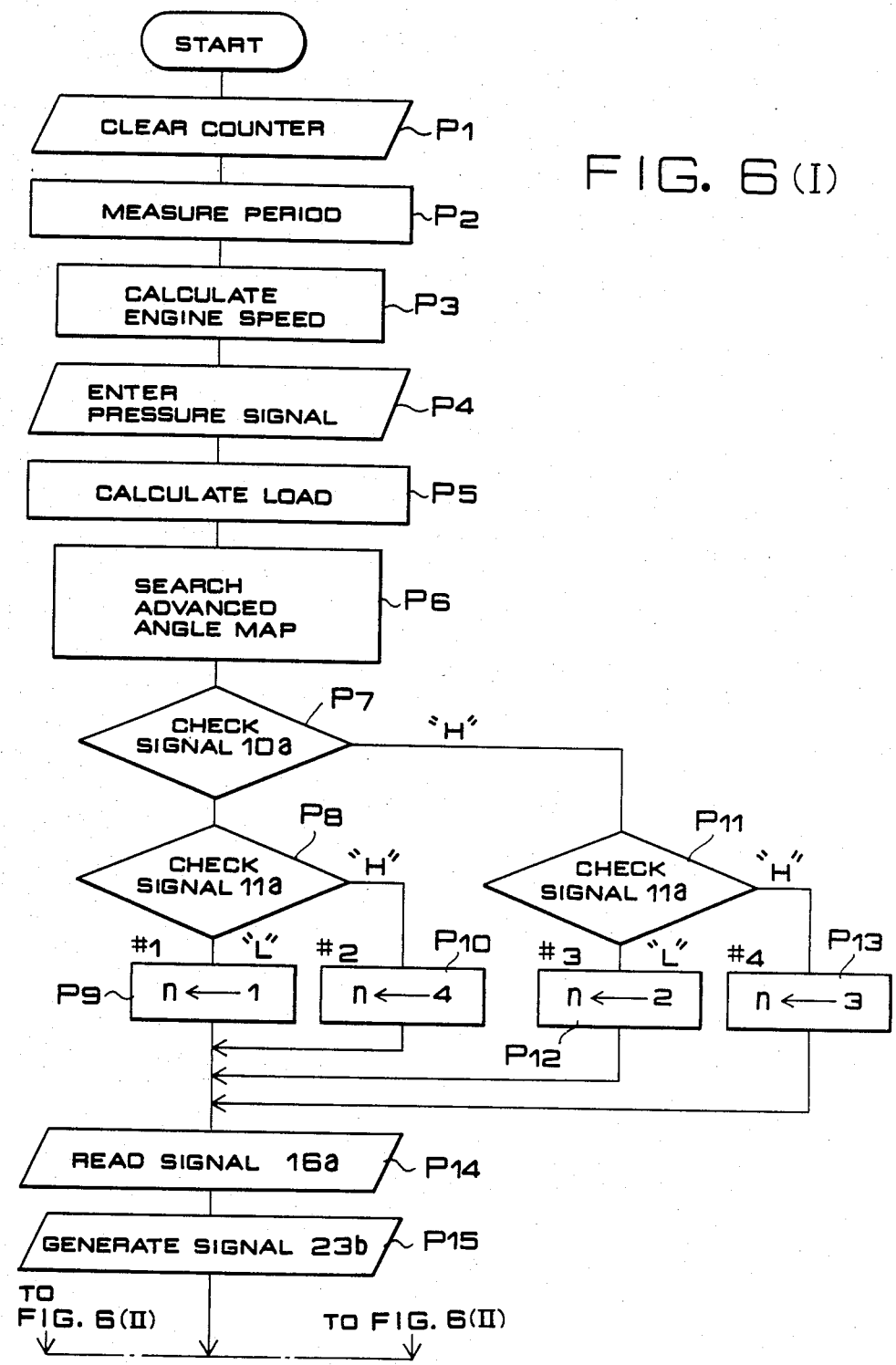
FIGS. 6(I) and (II) are a flowchart showing the operation of the system shown in FIG. 5.

FIG. 6 shows in flowchart the process carried out by the CPU 21. In the figure, symbols P1-P33 indicate the execution steps of the process. The flowchart shows the case of a 4-cylinder engine in which ignition takes place in the order of the first, third, second and fourth cylinders.

FIG. 5 shows in block form the ignition timing control system according to another embodiment of the present invention. In FIG. 5, reference number 1 denotes a load sensor means and reference number 2 denotes an engine speed detection means. A reference control value generation means 3 incorporates a memory which stores the predetermined reference control values for providing reference ignition timing characteristics arranged in the 2-dimensional address space, and a reference control value is read out from the memory by being addressed in accordance with the load and speed of the engine as detected by the detection means 1 and 2. A memory means 31 has an area for each cylinder for storing modification control values arranged in the 2-dimensional address space corresponding to the engine speed and load, and calculates the knock control successive modification value in accordance with information of cylinder to be ignited next as provided by the cylinder identification means 4 and the engine speed as provided by the speed detection means 2, then produces the ignition timing modification value by modifying the stored modification value using the calculated value and delivers the result to the control value calculation means 7. If knocking has occurred during a certain period of the engine operation, the modification calculation means 32 updates the stored modification value of that cylinder in the direction of delayed crank angle, while updating the stored value in the direction of advanced crank angle if knocking has not occurred. The control value calculation means 7 modifies the read-out reference control value using the ignition timing modification value produced for the cylinder to be ignited by the modification value calculation means 32, so as to determine the ignition timing and deliver the ignition signal to the ignition means 9 through the timing conversion means 8 to perform ignition at the determined ignition timing.

The actual circuit for performing the foregoing operation can be arranged, for example, as shown in FIG. 2. In this example, the crank angle detectors 10 and 11 produce output signals having the waveform as shown in FIG. 3.

FIG. 6 shows the flowchart of the process executed by the CPU 21. This flowchart is applicable for the case of a 4-cylinder engine in which ignition takes place in the order of the first, third, second and fourth cylinders.

The computation carried out by the CPU 21 takes place once in an ignition period in synchronism with the transition of the output signals produced by the crank angle detectors 10 and 11.

In step P1, the counter in the timing conversion circuit 18 is cleared and then started counting. In step P2, the time interval from the start point of the previous process to the present time, i.e., the period corresponding to the 180° rotation of the crank angle, is measured. The engine speed is calculated from the measured period in step P3. In step P4, the pressure signal is read in, and the load of the engine is calculated from this signal in step P5. In step P6, the advanced angle map is addressed in accordance with the speed and load which have been calculated in steps P3 and P5 so as to read out a corresponding reference control value, and it is stored in register A.

Step P7 checks the state of the signal 10a provided by the crank angle detector 10. If the signal is "low", the cylinder which has just been ignited is the first or second cylinder. The subsequent step P8 checks the state of the signal 11a provided by the crank angle detector 11, and if it is "low", the previously ignited cylinder is found to be the first cylinder, and register n provided within the memory 22 is set to "1" indicating the order of ignition for the first cylinder in step P9. If, in step P8, the signal 11a is "high", numeral "4" indicating the order of ignition for the second cylinder is stored in the register n. On the other hand, if the signal 10a of the detector 10 is found "high" in step P7, the previously ignited cylinder is the third or fourth cylinder. In this case, step P11 similar to step P8 takes place to check the state of the signal 11a, and if it is "low", numeral "2" indicating the order of ignition for the third cylinder is stored in register n in step P12, or if it is "high", numeral "3" indicating the order of ignition for the fourth cylinder is stored in register n in step P13. In Step P14, the knock signal 16a ($\Delta K$) is read in, and in step P15 the signal 23b for clearing the integral value of the discriminator 15 is generated for the preparation of the subsequent detection of knocking. In step P16, the contents of register C (n) corresponding to the cylinder identified in steps P7-P13, out of registers provided within the memory 22 for each cylinder for storing successive modification values, are modified using the knock signal 16a ($\Delta K$) entered in step P14. In step P17, the engine speed at the start-up of the engine steady-state counter, as will be described later, is compared with the engine speed measured in step P3, and if the difference is 50 RPM or more, indicating the significant variation of the engine speed, control will proceed to step P26; otherwise, the engine speed is recognized to be substantially constant. Subsequently, in step P18, the load variation relative to the state at count start is checked. If the load variation is found to be 5% or more, indicating a significant change in the engine operating condition, control will proceed to step P26. If the load variation is less than 5%, the engine operating condition is recognized to be substantially constant. In step P19, the contents of register D (n) of the corresponding cylinder, out of registers for counting the engine speed and load, are added by one. Step P21 checks whether or not the count of the register D (n) is equal to 100, i.e., whether or not the cylinder is operated in the constant condition for a period of 100 consecutive ignitions. If ignition has not yet taken place 100 times, control proceeds to step P28. In the case of D (n)=100, it is checked in step P21 whether or not the successive modification value C (n) which has been produced in step P16 for that cylinder is zero. If C (n)=0, indicating that knocking has not occurred in this cylinder during a period of 100 consecutive ignitions, a modification value B (n) stored on the learning map is read out in step P22 in accordance with the engine speed and load obtained previously in steps P3 and P5 and information of cylinder identified in steps P7–P13, and it is subtracted by one and stored again in B (n). If C (n)≠0, indicating that knocking has occurred in a period of 100 ignitions, the modification value B (n) stored on the learning map is added by the successive modification value C (n), then stored again in B (n) in step P23. Then, in step P24, the successive modification value C (n) is reset to zero (initialized). Subsequently, in step P25, the register D (n) for counting the number of ignitions is cleared for the subsequent updating of the stored modification value B (n), and the engine speed and load at this time are memorized as a reference for testing the steady-state operation. On the other hand, if the variation in the engine operating condition is detected in step P17 or P18, the successive modification value produced before the change of the operating condition is assumed to be meaningless, and the register C (n) storing the successive modification value is cleared in step P26. In the subsequent step P27, the register D (n) for storing the number of ignitions is cleared and initialization for updating the stored modification value is carried out by memorizing the current engine speed and load, as in step P25.

In this way, modification values on the learning map are updated for each cylinder when the engine is operated in a steady-state for a period of 100 ignitions. If knocking has not occurred during a period of 100 ignitions, the stored modification value is assumed to be excessive and it is corrected in the decreasing direction. The modification value does not need to be a positive value, but it can take a negative value when knocking does not occur successively. On the other hand, if the occurrence of knocking has been detected, the modification value is corrected in the increasing direction. If the engine is not operated in steady-state, updating of the modification value is inhibited so as to prevent the meaningless updating of the stored modification value based on knocking which has occurred before the change of the operating condition.

Upon completion of the process for the knocking which has occurred at the previous ignition, the system enters the process for determining the ignition timing for the cylinder ignited next. In step P28, the order of ignition "n" for the cylinder which has been ignited previously as obtained in steps P7–P13 is added by one in order to specify the cylinder to be ignited next. Namely, if previously ignited cylinder is the first cylinder and the register n contains "1", it is added by one to become "2" and the corresponding cylinder is found to be the third cylinder. Step P29 checks whether or not the contents of the register n has reached "5" as a result of calculation in step P28. If n=5, the previously ignited cylinder is found to be the second cylinder and the next cylinder is the first cylinder, then in step P30 the register n is made to have "1".

After the cylinder to be ignited next has been determined, a modification value B (n) for that cylinder is read out on the learning map in step P31 in accordance with the engine speed and load as obtained in the steps P3 and P5, then it is added by the successive modification value for that cylinder to produce the ignition timing modification value. In step P32, a reference control value A corresponding to the engine speed and load as obtained in steps P3 and P5 is read out from the advanced angle map, which is then subtracted by the ignition timing modification value B obtained in step P31 so as to produce the control value for determining the ignition timing for the next cylinder. The resultant control value indicates the point of ignition in terms of the crank angle. In step P33, this data is converted into data of time lag from the time point of transition of the output from the crank angle detector 10 or 11 (i.e., at the time of count start of the counter in step Pl). This angle-to-time conversion can readily be performed based on information of period obtained in step P2. In step P33, the ignition timing control value converted to the time signal is held in the latch of the timing converter 18. The counter within the timing converter 18 has started counting at the start-up of computation of the CPU 21, i.e., when the output of the crank angle detector 10 or 11 has made transition, and at a time point when the count value becomes equal to the latched value, the timing converter 18 generates a signal 18a, which causes the ignition circuit 17 to cut off the current in the primary winding of the ignition coil so that the engine is ignited at a timing as determined by the microcomputer 20.

According to this embodiment, the steady-state operation of the engine is detected, stored modification values on the learning map provided for each cylinder are updated during the steady-state operation so that the successive modification value for each cylinder becomes small, and the reference ignition timing is modified for each cylinder based on the stored modification value and a small successive modification value, whereby ignition at the critical knock point of individual cylinder is made possible. On the other hand, during the transient operating condition of the engine, updating of the stored modification value is inhibited, and ignition takes place at the timing which is modified by the reference ignition timing modified by the stored modification value which has been obtained during the past steady-state operation. Accordingly, ignition timing of each cylinder is controlled promptly to individual critical knock point even when the operating condition of the engine is varied, whereby high response of feedback control for the ignition timing by the knock signal is achieved and also the accuracy of control is enhanced due to a narrow control range by the successive modification value. In addition, the modification value stored on the learning map can take either positive or negative polarity, allowing control in the advanced angle region beyond the reference ignition timing. Therefore, even if the reference ignition timing is set to a point later than the critical knock point, ignition at the critical knock point is made possible by updating the stored modification value in the advanced direction.

Although in the foregoing embodiment the stored modification value is updated at every 100 ignitions of a related cylinder, it may be carried out on expiration of a certain time length. Although in the foregoing embodiment cylinder identification is carried out using information provided by two crank angle detectors, the present invention is not limited to this, but for example, a detection means for identifying the reference cylinder may be provided so as to identify each cylinder by counting the order of ignition, without affecting the substance of the present invention.

Figure 7I:
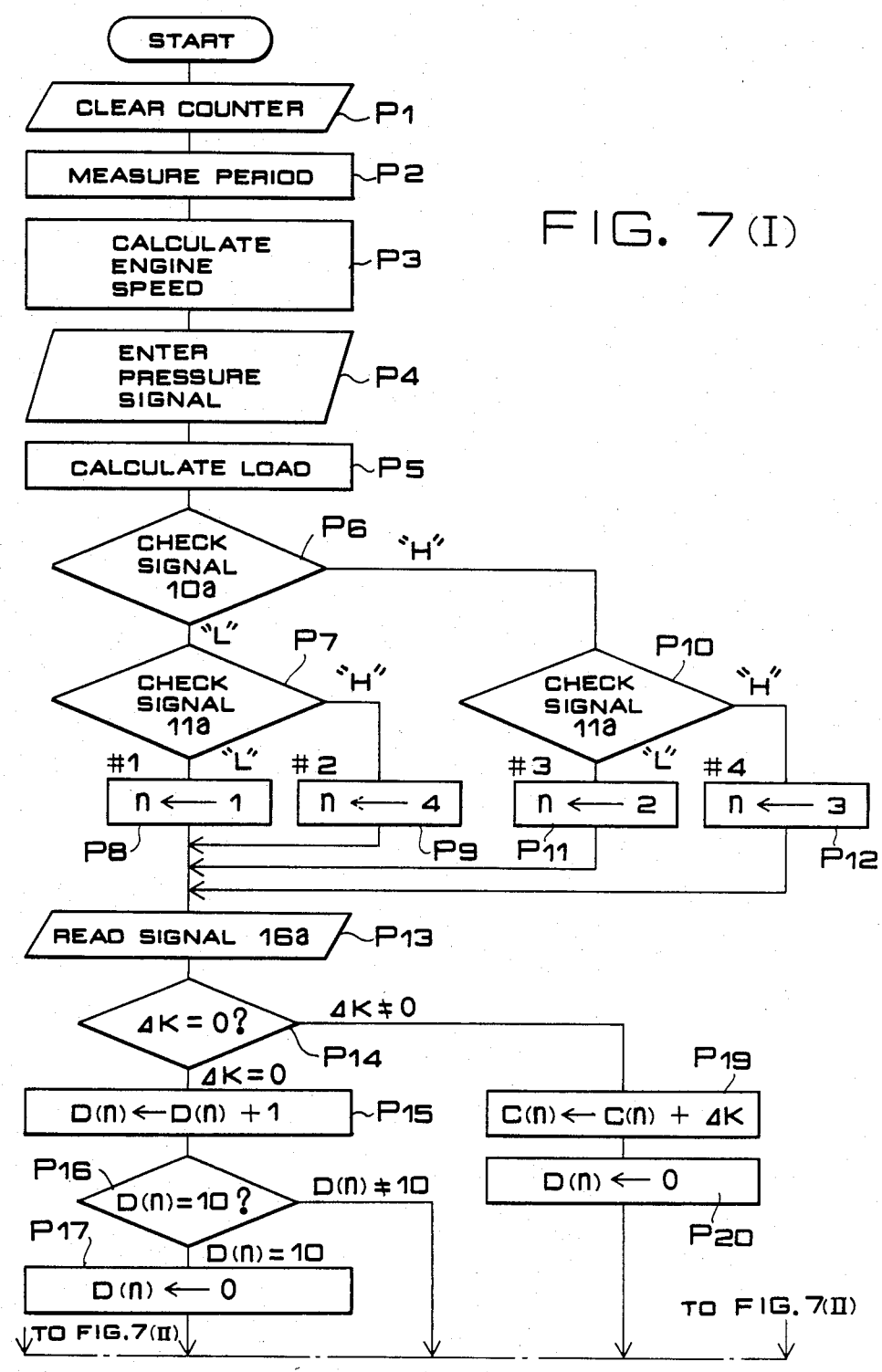
FIGS. 7(I) and (II) are a flowchart showing the operation of still another embodiment of the present invention.
Figure 7:
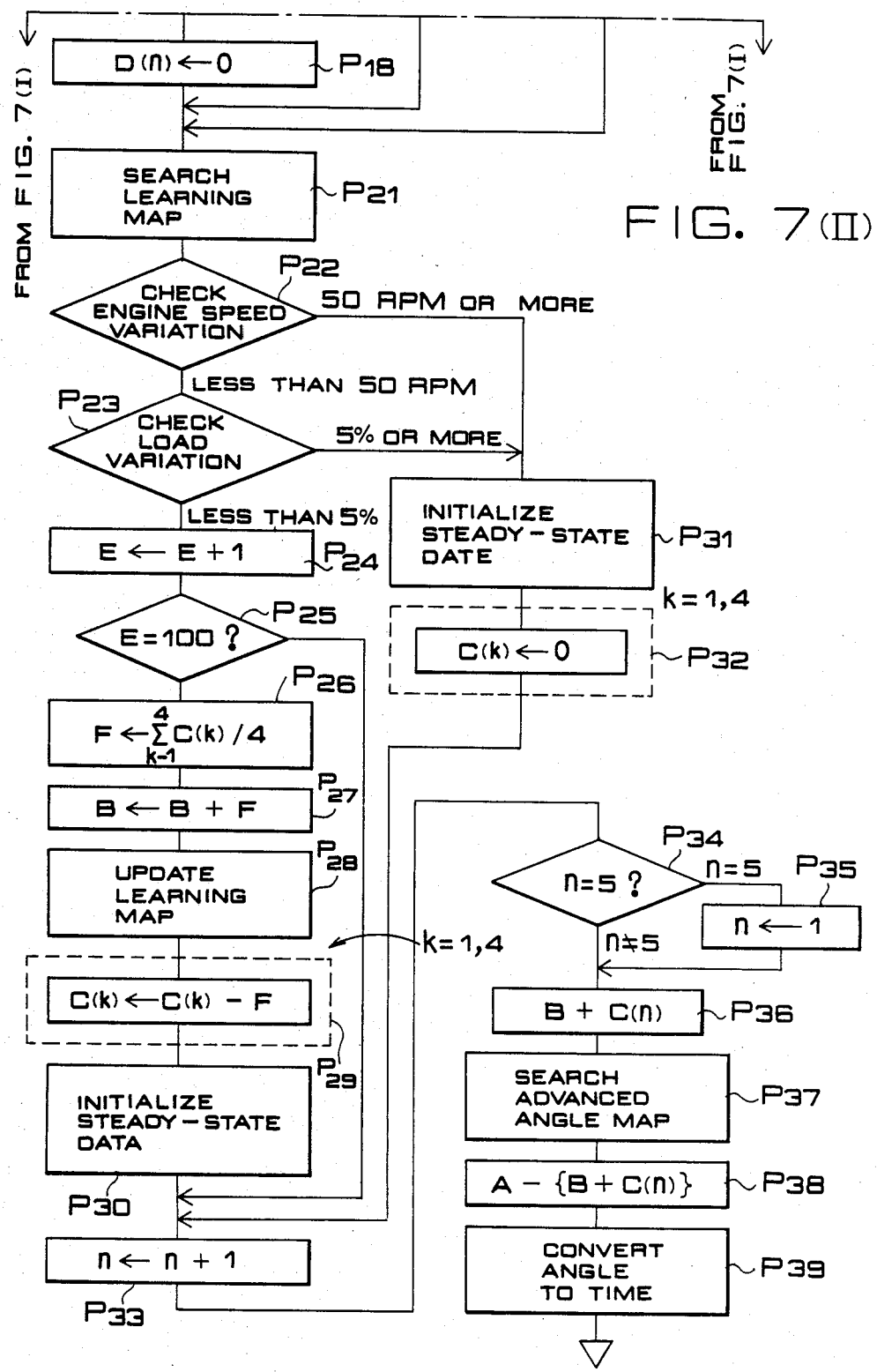

The present invention further provides another arrangement for carrying out effectively the knock suppression for the engine. In FIG. 7 showing in flowchart the operation of the system according to this embodiment, the microcomputer 20 performs certain processings in accordance with the signals provided by the crank angle detectors 10 and 11, pressure sensor 12 and acceleration sensor 14 shown in FIG. 2 so as to control the ignition timing as in the cases of the above two embodiments, but there are slight differences in the signal processing carried out by the microcomputer 20. The CPU 21 performs computation once in each ignition period in synchronism with the transition of the signals from the first and second crank angle detectors 10 and 11. In step P1, the counter in the timing converter 18 is cleared, then it is started counting. In step P2, the time interval from the start-up of the previous processing to the present time point, i.e., the time period corresponding to a crank angle of 180°, is measured. This time length is converted into the engine speed in step P3. In step P4, the pressure signal is introduced, and the load of the engine is calculated from this signal in step P5. Step P6 checks the state of the signal 10a provided by the crank angle detector 10. If the signal is "low", the cylinder which has just been ignited is the first or second cylinder as shown in FIG. 3. The subsequent step P7 checks the state of the signal 11a from the second crank angle detector 11, and if it is "low", the previously ignited cylinder is identified to be the first cylinder, and numeral "1" indicating the order of ignition for the first cylinder is stored in the register n provided in the memory 22. If, on the other hand, the signal 11a is found "high" in step P7, numeral "4" indicating the order of ignition for the second cylinder is stored in the register n. If, in step P6, the signal 10a of the first crank angle detector 10 is found "high", the previously ignited cylinder is the third or fourth cylinder. Then, in step P10, the state of the signal 11a from the detector 11 is checked as in step P10, and if it is "low", numeral "2" indicating the order of ignition for the third cylinder is stored in register n in step P11, or if it is "high", numeral "3" indicating the order of ignition for the fourth cylinder is stored in register n in step P12.

In step P13, after the knock signal 16a ($\Delta K$) has been read, the signal 23b for clearing the integral value of the discriminator 15 is generated for the preparation of the subsequent detection of knocking. Step P14 checks whether or not the signal 16a ($\Delta K$) which has been read is zero, i.e., whether or not the previous ignition has caused knocking on the related cylinder. If knocking has not occurred, the contents of register D (n) for the previously ignited cylinder as identified in steps P6–P12, out of registers provided for each cylinder for updating the successive modification value, is added by one, and it is stored again in the register D (n). Subsequently, in step P16, it is checked whether the contents of register D (n) has reached 10, i.e., whether or not the signal 16a ($\Delta K$) has stayed zero during a period of 10 consecutive ignitions of that cylinder, and if D (n)=10, the contents of register C (n) storing the successive modification value for that cylinder is subtracted by one in step P17. In step P18, the register D (n) used for the foregoing count operation is cleared for the preparation of the subsequent count operation of 10 ignitions. On the other hand, if D (n)≠10 in step P16, indicating that the number of ignitions has not reached 10 times, the register C (n) for storing the successive modification value is kept unchanged, and control proceeds to step P21. If, in step P14, the signal 16a is active ($\Delta K \neq 0$), the contents of C (n) is added by $\Delta K$ in step P19 so that it is increased in proportion to the degree of strength of knocking, and in the subsequent step P20 the register D (n) for counting the number of ignitions is cleared for the preparation of the count operation of 10 ignitions.

Accordingly, the contents of the register C (n) which vary depending on the state of knocking are updated in the increasing direction in proportion to the degree of strength of knocking when the occurrence of knocking has been detected by the signal 16a provided at each ignition of that cylinder. If knocking has not occurred, the C (n) contents are updated in the decreasing direction by one at every 10 ignitions of that cylinder. The range of variation is set so that the value can take either positive or negative polarity. The counting of 10 ignitions for determining the decreasing gain is merely one example, and the present invention is not limited to this.

After the successive modification value for the cylinder, in which knocking has occurred by the previous ignition, has been updated, the system enters the updating process beginning with step P21 for the modification value stored in the learning map.

In step P21, the modification value stored in the learning map is read out by being addressed in accordance with the engine speed and load obtained in steps P3 and P5 into the register B. In the subsequent step P22, the engine speed obtained in step P3 is compared with that at the count start of register E for counting the steady-state of the engine as will be described later, and if the difference is 50 RPM or more, indicating that the engine speed has varied, control proceeds to step P31. If the differential engine speed is less than 50 RPM, indicating that the engine is operated at a constant speed, the variation in load since the count start of the register E is checked in step P23. If a load variation of 5% or more is detected, indicating that the engine operating condition has been varied, control proceeds to step P31; otherwise, control proceeds to step P24. In step P24, the contents of register E for counting the steady-state operating condition of the engine is added by one. Step P25 checks whether or not the count of register E is equal to 100, i.e., whether or not the engine has been operated at a constant speed and load during a period of 100 consecutive ignitions. If E=100, control proceeds to step P26, in which the mean value of successive modification value of each cylinder is calculated and stored in register F. In the subsequent step P27, the mean value of the successive modification value is added with the modification value which has been read out of the learning map and stored in register B, and the result is stored again in the register B. In step P28, the modified value of register B is stored in the corresponding area of the learning map. In step P29, the successive modification value of each cylinder is subtracted by the mean value F of the successive modification values, so as to update the successive modification value of each cylinder. In step P30, the register E for counting the steady-state condition is cleared for the subsequent updating of the stored modification value, and the engine speed and load at this time are recorded as references of checking the steady-state operating condition, then control proceeds to step P33.

On the other hand, if the variation in the engine operating condition is detected in step P22 or P23, the register E is cleared in step P31, and the engine speed and load are recorded as references of checking the steady-state operating condition following the next ignition. The successive modification value of each cylinder before the variation of the engine operating condition is meaningless for the operation after the variation, and therefore these values are cleared in step P32 and control proceeds to step P33. Thus, stored modification value on the learning map is updated when a steady-state operating condition of the engine lasts for a period of 100 ignitions. The updating takes place in the direction of nullifying the mean value of the successive modification value for knock suppression which is carried out for each cylinder. Namely, the stored modification value is updated such that the successive modification value of each cylinder corrects only deviation from the mean value at the critical knock point of each cylinder. When the engine does not operate in a steady-state condition, updating of the modification value is inhibited so as to prevent meaningless updating based on the modification value in the knock suppression state before the change of the engine operating condition.

Although in updating the modification value the engine operating condition is determined to be steady-state when the variation of engine speed is less than 50 RPM and the variation of load is less than 5%, this is merely an example, and another criteria may be used. Although updating of the modification value is carried out when the number of ignitions of the engine counted has reached a certain value, updating may take place on expiration of a certain time length.

After the updating process for the stored modification value on the learning map has been completed, the system enters the process for determining the ignition timing of the cylinder to be ignited next. In step P33, the order of ignition "n" for the cylinder which has been ignited is added by one in order to identify the cylinder to be ignited next. Namely, when the previously ignited cylinder is the first cylinder, the register n contains "1", which is added by one to become "2", and the cylinder corresponding to this order of ignition is the third cylinder. Step P34 checks whether or not the contents of the register n has reached "5" as a result of calculation in step P33. If n=5, indicating that the previously ignited cylinder is the second cylinder and the first cylinder is to be ignited next, the register n is made to have "1" in step P35. Thus, the cylinder to be ignited next is determined by this process. In step P36, the contents of register B storing the modification value (which has been read out of the learning map in step P21, and it is an updated modification value when the processes of steps P26-P30 have been conducted) are added with the contents of the register C (n) of successive modification value corresponding to the cylinder to be ignited next (the updated value when step P29 has been conducted), so as to produce the ignition timing modification value. In step P37, the reference control value on the advanced angle map is read out by being addressed in accordance with the engine speed and load obtained in steps P3 and P5, and it is subtracted by the ignition timing modification value obtained in step P36 so as to produce the control value for determining the ignition timing for the cylinder to be ignited next. The control value as a result of this calculation indicates the ignition point expressed in crank angle, and this data is converted in step P39 into data of time lag from the transition of the output of the crank angle detector 10 or 11 (at count start in step P1). The angle-to-time converting calculation can readily be performed based on information of period. In step P39, the ignition timing control value in time domain is set to the latch in the timing converter 18.

The timing converter 18 has a counter, which has started counting since the microcomputer 20 has started computation, i.e., when the output of the first or second crank angle detector 10 or 11 has made transition. When the count becomes equal to the value set in the latch in step P39, the timing converter issues an ignition signal, which cuts off the current in the ignition coil of the ignition circuit 11, and the engine is ignited at the timing determined by the microcomputer 20.

According to this embodiment, the steady-state operation of the engine is detected, the modification value for providing the ignition timing at the critical knock point of each cylinder is stored on the learning map as addressed in accordance with the engine operating condition, the successive modification value for each cylinder is produced based on the knock signal detected at every ignition, and the reference ignition timing is modified based on the successive modification value and the stored modification value, whereby the ignition timing for each cylinder can be controlled to individual critical knock point. On the other hand, during the transient state of the engine, updating of the stored modification value is inhibited, and the reference ignition timing for each cylinder is modified by the modification value obtained under the steady-state operation, whereby when the operating condition is varied, the ignition timing for each cylinder is controlled to the averaged critical knock point of cylinders following the change of the operating condition. Namely, only the variation in the critical knock point among cylinders is corrected by the successive modification value produced by the knock signal, resulting in a very high response of the feedback control of the ignition timing. Moreover, it is merely required to modify the deviation of the ignition timing of each cylinder from the mean value, and the system can have a narrow control range and the accuracy of control can be enhanced.

The modification values on the learning map and the successive modification values of each cylinder can take either positive or negative polarity, allowing the ignition timing to be controlled in the advanced direction beyond the reference ignition timing, and therefore even if the reference ignition timing is set later than the critical knock point, the stored modification value can be updated in the advanced direction, whereby the engine can be operated at the critical knock point of each cylinder throughout the entire operating condition.

Although in the foregoing embodiment the modification value is updated merely by averaging the successive modification values of cylinders, the stored modification value can be updated in other ways, for example, through the averaging of values which are weighted in accordance with the magnitude and polarity of the successive modification values. Although in this embodiment cylinders are identified in accordance with information provided by two crank angle detectors, the invention is not limited to this, but for example a detection means for identifying the reference cylinder may be provided so that each cylinder can be identified by counting the ignition, without affecting the substance of the present invention.

According to the present invention as described above, the reference ignition timing is determined to the basis of memory data which has been programmed in advance in correspondence to the operating condition of the engine, and the reference ignition timing is controlled in either the forward or backward direction of the crank angle by the modification value which can take either positive or negative value in accordance with knock information detected for each ignited cylinder. On this account, even if the ignition timing at the critical knock point varies in each cylinder, all cylinders are controlled to the ignition timing of each critical knock point, and even in the operating mode where the reference ignition timing is set later than the critical knock point, each cylinder can be controlled individually on a feedback basis by the knock signal, while controlling the actual ignition timing in the advanced direction with respect to the reference ignition timing. Accordingly, each cylinder can be controlled to the optimal ignition timing at the critical knock point through the detection of the knock signal in the entire range of the operating condition. This allows extremely accurate advanced angle control, and does not necessitate the setting of the reference ignition timing earlier than the critical knock point. For example, by setting the reference ignition timing at the center of critical knock points of cylinders, feedback control by knock detection is made possible in all operating conditions, whereby the occurrence of large knocking at the start-up of control due to an excessive advance in reference ignition timing setting can be prevented.

What is claimed is:

1. An ignition timing control system for an internal combustion engine with a plurality of cylinders comprising:
   means for detecting the occurrence of knocking of said engine;
   sensor means for detecting the operating condition of said engine;
   means for generating a reference control value in correspondence to an engine operating condition detected by said sensor;
   means for identifying one of said cylinders to be ignited next;
   means for increasing or decreasing an ignition timing modification value for a cylinder identified by said cylinder identification means in accordance with the output of said knock detection means;
   means for determining the ignition timing for a cylinder to be ignited next in accordance with a control value obtained through a certain computation based on said reference control value and said modified ignition timing modification value, said means for varying the ignition timing modification value being capable of varying said modification value so that the ignition timing modification value can take either positive or negative polarity.

2. An ignition timing control system according to claim 1, wherein said engine operating condition sensor comprises a load detection means for detecting the load of said engine and an engine speed detection means, said load detection means and said engine speed detection means have their output terminals connected to the input terminals of said reference control value generating means.

3. An ignition timing control system according to claim 1, wherein said load detection means comprises a pressure sensor which detects the intake manifold pressure of said engine.

4. An ignition timing control system according to claim 1 wherein said engine speed detection means and said cylinder identification means comprise a first angle detector with its output signal level reversing the polarity at every revolution of the crank shaft of said engine and a second angle detector with its output signal having a phase lag of 180° with respect to the output signal of said first angle detector.

5. An ignition timing control system according to claim 1, wherein said cylinder identification means, said means for varying said ignition timing modification value, and said ignition timing determination means are included within a microcomputer.

6. An ignition timing control system for an internal combustion engine with a plurality of cylinders comprising:
   means for detecting the occurrence of knocking of said engine;
   sensor means for detecting the operating condition of said engine;
   means for generating a reference control value in correspondence to the engine operating condition detected by said sensor means;
   means for identifying one of said cylinders to be ignited next;
   memory means having addresses corresponding to presumed operating conditions for storing modification control values of ignition timing corresponding to each operating condition;
   means for addressing said memory means in correspondence to an operating condition of said engine detected by said sensor means and reading out the stored modification control value;
   modification value computation means for modifying the modification control value read out from said memory means in accordance with a knock control successive modification value calculated for each cylinder based on information of cylinder provided by said cylinder identification means and the knock signal provided by said knock detection means, said modification value computation means, if knocking has been detected during a continuous operation of said engine within a predetermined time length, varies the modification control value for a cylinder, in which knocking has occurred, in the direction of delayed crank angle, or if knocking has not been detected, varies the modification control value in the direction of advanced crank angle, and updates the contents of said memory means with said varied modification control value;
   means for identifying one of said cylinders to be ignited next;
   means for increasing or decreasing the ignition timing modification value for a cylinder to be ignited next as identified by said cylinder identification means in accordance with the output of said knock detection means; and
   means for determining the ignition timing of a cylinder to be ignited next in accordance with the control value obtained through a certain computation basing on said reference control value and said varied ignition timing modification value.

7. An ignition timing control system according to claim 6, wherein said operating condition sensor means comprises a load detection means for detecting the load of said engine and an engine speed detection means, said load detection means and engine speed detection means having their output terminals connected to the input terminals of said reference control value generating means.

8. An ignition timing control system according to claim 6, wherein said load detection means comprises a pressure sensor for detecting the intake manifold pressure of said engine.

9. An ignition timing control system according to claim 6, wherein said engine speed detection means and said cylinder identification means comprise a first angle detector with its output signal level reversing the polarity at every revolution of the crank shaft of said engine and a second angle detector with its output signal having a phase lag of 180° with respect to the output signal of said first angle detector.

10. An ignition timing control system for an internal combustion engine with a plurality of cylinders comprising:

means for detecting the occurrence of knocking of said engine;

sensor means for detecting the operating condition of said engine;

means for generating a reference control value in correspondence to the operating condition of said engine detected by said sensor means;

means for identifying one of said cylinders to be ignited next;

means for generating a successive modification value for the ignition timing determined based on the output of said knock detection means for each cylinder identified by said cylinder identification means;

means for varying said successive modification value for each cylinder obtained at each different operating condition depending on whether or not knocking has been detected by said knock detection means in a predetermined time length, so as to obtain modification control values;

memory means having addresses corresponding to various operating conditions for storing said modification control values;

means for addressing said memory means in correspondence to the operating condition detected by said sensor means and reading out a modification control value stored therein;

modification computation means for modifying the modification control value read out of said memory means in accordance with a knock control successive modification value for each cylinder calculated based on information of cylinder provided by said cylinder identification means and the knock signal provided by said knock detection means; and means for determining the ignition timing for a cylinder to be ignited next in accordance with the control value obtained from the output value of said modification value computation means and said reference control value.

11. An ignition timing control system according to claim 10, wherein said sensor means comprises a load detection means for detecting the load of said engine and an engine speed detection means, said load detection means and said engine speed detection means having their output terminals connected to the input terminals of said reference control value generating means.

12. An ignition timing control system according to claim 10, wherein said load detection means comprises a pressure sensor for detecting the intake manifold pressure of said engine.

13. An ignition timing control system according to claim 10, wherein said engine speed detection means and said cylinder identification means comprise a first angle detector with its output signal level reversing the polarity at every revolution of the crank shaft of said engine and a second angle detector with its output signal having a phase lag of 180° with respect to the output signal of said first angle detector.

* * * * *